Nov. 5, 1963    R. McAULAY ETAL    3,109,812
LIQUID STRAINERS
Filed Feb. 28, 1961    2 Sheets-Sheet 1
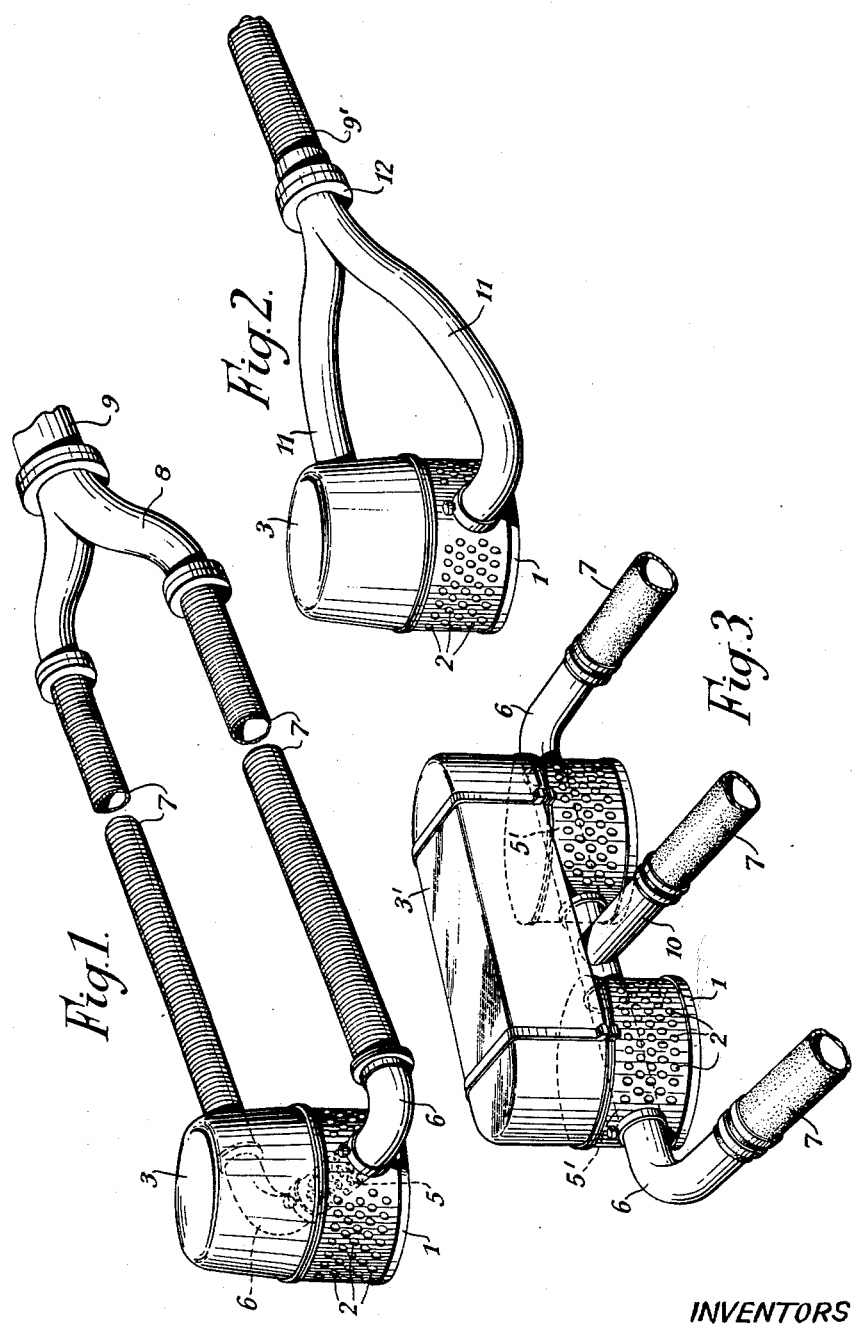
INVENTORS
ROBERT McAULAY
BY WILLIAM G. RICHARDSON
ATTORNEYS

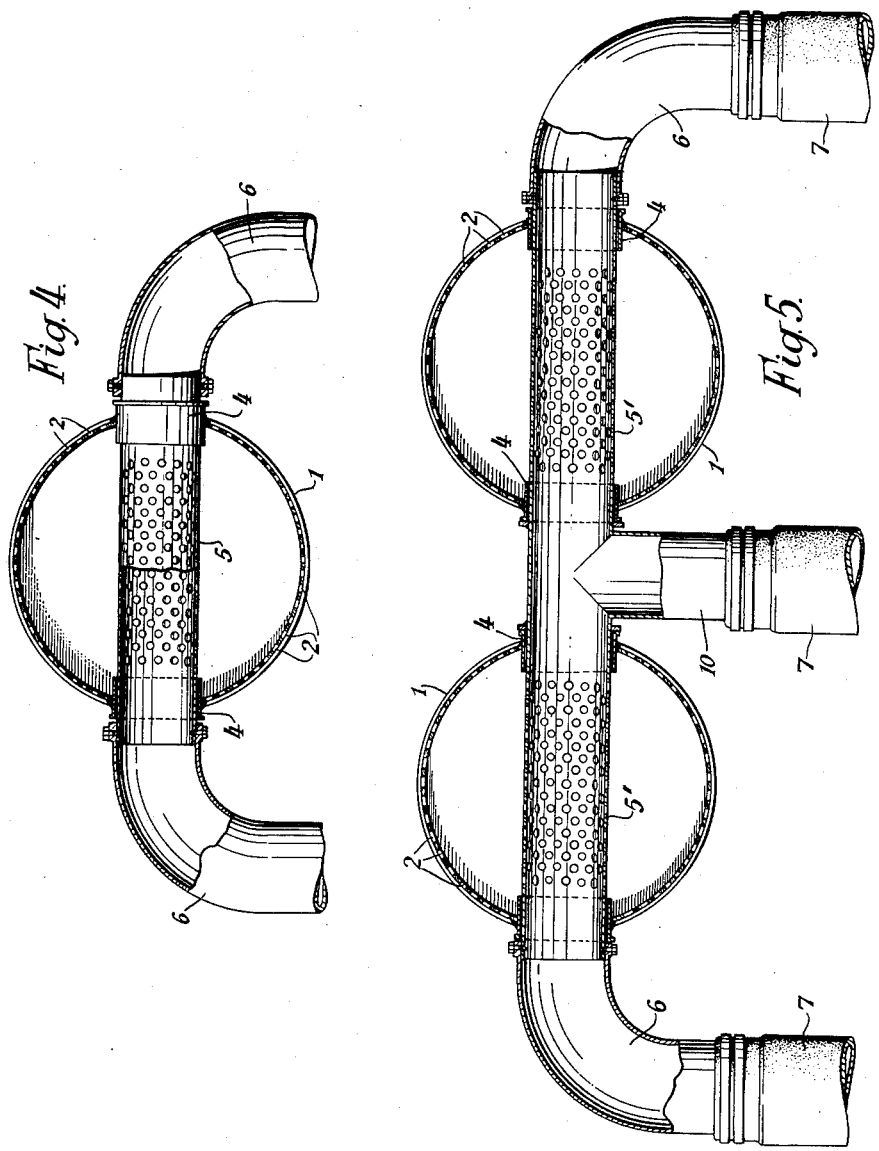

United States Patent Office
3,109,812
Patented Nov. 5, 1963

3,109,812
LIQUID STRAINERS
Robert McAulay, Edgeware, and William George Richardson, London, England, assignors to Megator Pumps and Compressors Limited, London, England
Filed Feb. 28, 1961, Ser. No. 92,293
Claims priority, application Great Britain Mar. 16, 1960
7 Claims. (Cl. 210—242)

The liquid strainer forming the subject of the present invention has been designed primarily for association with a pump for extracting water from mines, quarries, excavations and the like but has many other applications where it is desired to provide a strainer which will float in an upright position in the liquid being pumped and having a direct or indirect connection with a suction pump by means of a flexible intake or suction pipe, the strainer serving to exclude large solids. By virtue of the fact that the strainer floats in the liquid being pumped, the liquid can be drawn off from a point just below the surface where it is free from mud, silt or other suspended or floating matter.

The strainer in accordance with the present invention is similar in certain respects to that forming the subject of earlier Patent No. 2,957,579 in that perforations are provided in the walls of the strainer body or in a separately formed strainer element, the perforations in either case being situated at the lower end of the body, the bottom of the strainer being unperforated so that the strainer can in fact rest on the bottom when operating in a very shallow liquid in which the depth of the liquid is insufficient to allow it to float and without drawing in mud or like material from the surface on which it is resting.

In the earlier patent above referred to the strainer body had a swivel connection with the flexible suction pipe, the latter being connected with a length of rigid pipe or tube which was passed through diametrally opposite holes in the strainer body which provided bearings for the pipe or tube and permitted the parts to swivel, thus ensuring that the vertical attitude of the strainer was not affected by twisting of the flexible suction pipe, the walls of the pipe or tube being formed with perforations near the end which was connected with the flexible suction pipe, the other end of the pipe or tube being closed.

In this earlier construction the strainer body was provided with a buoyancy chamber or float near its upper end, the natural tendency being for the strainer to float upright. It will be appreciated, however, that any tilting of the strainer from its normal upright position tended to cause air to be drawn in through the uncovered perforations and consequently it is desirable to avoid such tilting if possible. With the earlier form of strainer under certain circumstances for example when operating in deep water, the downward drag of the flexible suction pipe on the strainer could tilt the strainer in a vertical plane containing the pipe's longitudinal axis.

The chief object of the present invention is to provide a better balanced arrangement in which the weight of the pipe will have little or no tendency to move the strainer out of its normal vertical position.

A liquid strainer in accordance with the present invention is provided with liquid outlets on its opposite sides connected with a balanced system of branch or main suction pipes having a swivel connection with the strainer which will permit of free rise and fall movement of the suction pipes without deflection of the strainer from its normal upright position.

According to a further feature of the invention a plurality of strainer bodies may be associated with a common rigid pipe or tube which projects through the bodies, parallel or substantially parallel flexible suction pipes being connected with the ends of the rigid pipe or tube and connected therewith at a point or points intermediate the bodies, the suction pipes being free to swivel in relation to the strainer bodies in a vertical plane about the axis of the rigid pipe or tube.

Referring to the accompanying drawings:

FIGURES 1, 2 and 3 are perspective views of three alternative forms of liquid strainer in accordance with the invention and their associated suction pipes.

FIGURES 4 and 5 are horizontal sectional views taken on the axis of the rigid pipe or tube associated with the strainer shown in FIGURES 1 and 3 respectively.

All the liquid strainers illustrated each include one or more cylindrical bodies 1, the vertical walls of which are formed with perforations 2 for the admission of liquid but to exclude large solids, each body having a flat unperforated bottom, the upper end of the body carrying a float or buoyancy chamber 3, whereby the strainer will float in an upright position in the liquid with the perforations below the level of the liquid.

Alternatively the walls of the body may be provided with comparatively large openings or slots in its walls, the body containing a separately constructed and removable perforated strainer element.

The body is bored at two diametrally opposite points to receive short tubular bearing members 4 which can conveniently be welded in position, the bearing members carrying a length of rigid tube or pipe 5 which projects from opposite sides of the body and is a loose fit in the bearing members.

In this way the tube or pipe 5 can be withdrawn in an endwise direction from the strainer body for cleaning purposes, although it is within the scope of the invention to rigidly secure the tube or pipe in position so that it cannot be withdrawn.

The pipe 5 in the case of FIGURES 1 and 4 is connected with two tubular elbows 6 which in turn are connected to two parallel flexible suction pipes 7 which in turn may be connected through a Y fitting 8 to the pump or a main suction pipe 9 normally secured in a fixed position.

The rigid pipe 5 and the elbows 6 may be connected together in any suitable manner, preferably providing for easy dismantling for cleaning, as for example by means of radially-disposed screws as shown. The elbows 6 may be connected to the flexible suction pipes by means of hose clips as shown in FIGURES 3 and 5 or by flanged collars as shown in FIGURE 1, the latter being more appropriate to flexible metallic hose.

The elbows may be extended to form parallel rigid pipes or rigid pipes may be fixedly associated with the elbows to form parallel extensions thereof, the rigid pipes being connected with extension suction pipes which are flexible throughout their length.

It will be appreciated that due to the duplication of suction pipes 7 they may be of comparatively smaller diameter and wall thickness than a single pipe, thereby providing greater flexibility to accommodate the rise and fall of the liquid.

Furthermore the arrangement of the twin suction pipes arranged in the manner shown in FIGURES 1 and 4 or in accordance with the modification hereinbefore described, coupled with the fact that the rigid pipe or tube 5 is free to swivel in its bearing members provides a perfect balance and ensures the strainer maintaining an upright position in the liquid despite any movement of the pipes 7 in a vertical plane.

Referring now to FIGURE 2, the main flexible suction pipe 9' is connected with the ends of the rigid tube or pipe 5 by rigidly formed branch pipes 11 which take the form of a breechers fitting, a swivel joint connection 12 being interposed between parts 9' and 11 so that any twisting movement of the suction pipe 9' will not be communicated to the strainer body.

The branch pipes 11 are preferably detachably connected with the rigid tube or pipe 5 so that the latter can be withdrawn from the strainer body for cleaning purposes, the parts being for example connected by radially arranged screws or alternatively by flanged collars. The branch pipes will be free to pivot about the axis of the tube or pipe 5 under the rise and fall movement of the flexible suction pipe 9'. In the event of a tube or pipe 5 being used which is fixed in the strainer it will be necessary for the connection between the tube or pipe 5 and the branch pipes 11 to be one which will permit of swivelling movement of the branch pipes in relation to the strainer body.

With such an arrangement due to the upright position of the strainer being maintained under all circumstances when floating in the liquid, the rigid pipe 5 may be perforated throughout that part of its length lying within the strainer body instead of the perforations being confined to the end near the flexible suction pipe as in the earlier construction.

Referring now to FIGURES 3 and 5, a liquid strainer is shown including a plurality of strainer bodies 1 carried by a common float 3'. Two such bodies are shown but any number may be employed to suit particular requirements.

In this case the rigid pipe or tube 5' extends through the two spaced strainer bodies 1 and is provided with a branch connection 10 intermediate the strainer bodies to which a third flexible suction pipe 7 is connected, the two outer flexible suction pipes 7 being connected to the elbows 6. The elbows 6 and the branch connection 10 may be extended so that they are longer than as shown in the drawing.

The suction pipes again provide a balanced arrangement and may be connected with a suitable multi-way branch fitting associated with the pump or with a main suction pipe.

Although flexible suction pipes 7 are shown a fitting may be used somewhat similar to that shown in FIGURE 2, but utilizing three rigid branch pipes instead of two, the fitting having a swivel connection with the flexible main suction pipe.

It will be appreciated that by employing two or more suction pipes arranged in parallel or substantially parallel formation or a fitting such as that shown in FIGURE 2 and connected in the manner shown with the rigid pipe or tube associated with the strainer body or bodies, the arrangement will ensure greater stability in rough or flowing water, there being less likelihood of the strainer being tilted laterally during use.

The advantages of the constructions hereinbefore described are realised especially in strainers of comparatively large size.

We claim:

1. A floating strainer assembly adapted to float in upright condition without tilting, comprising at least one hollow body having an upper buoyancy portion and a lower strainer portion symmetrically disposed with respect to each other, the wall of said strainer portion having holes for the entry of liquid, spaced outlets in and axially aligned transversely of said strainer portion in a plane containing the centers of buoyancy and gravity of said body, a pair of tubular elbow portions, means swivelly connecting one end of each elbow portion to said strainer portion in communication through said outlets respectively with said strainer portion, said connecting means permitting removal of said elbow portions to provide ready access to the interior of said strainer portion for cleaning, and suction pipe means in communication with the other ends respectively of said elbow portions and arranged symmetrically relative to a vertical plane perpendicularly bisecting the axis of said strainer outlets to maintain said axis in horizontal position during floatation of the body while resisting any tendency to tilt said body out of upright position as said body swivels relative to said elbows during the rise and fall movement thereof, said suction pipe means including at least one flexible hose adapted to be connected in air-sealed relation with a fixed source of suction and enabling free rise and fall movement of said body.

2. A floating strainer assembly according to claim 1, wherein said suction pipe means comprises a pair of branch pipes each including a rigid portion in communication with one of said elbow portions and a flexible portion forming an extension of said rigid portion, said flexible portions of said branch pipes being of substantially equal length.

3. A floating strainer unit according to claim 1, wherein said swivel connecting means comprises a tube extending through said strainer portion and journaled in said outlets, said pipe having its ends respectively removably connected to said elbow portions and having fluid passage means in its wall positioned toward both ends of the tube and within the strainer portion for entry of fluid from said strainer.

4. A floating strainer assembly according to claim 1 wherein said suction pipe means comprises a pair of branch pipes each communicating at one end with one of said elbows and connected at its other end to said flexible hose by a swivel joint having an axis coaxial with that of said flexible hose and lying in said vertical plane.

5. A floating strainer assembly adapted to float in upright condition without tilting, comprising at least one hollow body having an upper buoyancy portion and a lower strainer portion symmetrically disposed with respect to each other, the wall of said strainer portion having holes for the entry of liquid, spaced bearings in and axially aligned transversely of said strainer portion in a plane containing the centers of gravity and buoyancy of said body, a tube freely journaled in said bearings and having nipples at each end extending beyond the side walls of said strainer portion, said tube having aperture means at each side of its center within the strainer portion for the entry of liquid from said strainer portion, a pipe-like fixture adapted to be mounted in fixed position and having two suction inlets spaced apart in a substantially horizontal plane, a pair of flexible pipes of substantially equal length arranged symmetrically relative to a vertical plane perpendicularly bisecting the axis of said tube, and means for removably connecting said flexible pipes at one end to said tube nipples and at the other end in air-sealed relation to said suction inlets, said connecting means permitting ready removal of said tube from the flexible pipes and strainer portion to provide ready access to the interior of the strainer for cleaning, and said symmetrical arrangement of the flexible pipes maintaining the tube in a horizontal position during floatation of said body to enable free rise and fall movement of said body while resisting any tendency to tilt said body out of upright position as said body swivels relative to said tube during the rise and fall movement thereof when floating.

6. A floating strainer assembly adapted to float in upright condition without tilting, comprising at least one hollow body having an upper buoyancy portion and a plurality of lower strainer portions symmetrically disposed with respect to each other, the walls of said strainer portions having holes for the entry of liquid, said strainer portions being spaced apart, bearings in and axially aligned transversely of said strainer portions in a plane containing the centers of gravity and buoyancy of said body, a tube common to said strainer portions freely journaled in said bearings and having nipples at each end extending beyond the outer side walls of said strainer portions and a nipple between strainer portions, said tube having aperture means within each strainer portion for the entry of liquid from said strainer portion, a pipe-like fixture adapted to be mounted in fixed position and having a plurality of suction inlets spaced apart in a substantially horizontal plane, and a plurality of substantially parallel flexible pipes of substantially equal length arranged symmetrically relative to a vertical plane perpendicularly bisecting the axis of said tube, means for removably connecting said flexible pipes at one end to said tube nipples and at the other end in air-sealed relation to said suction inlets, said connecting means permitting ready removal of said tube from the flexible pipes and strainer portion to provide ready access to the interior of the strainer for cleaning, and said symmetrical arrangement of said flexible pipes maintaining the tube in a horizontal position during floatation of said body to enable free rise and fall movement of said body while resisting any tendency to tilt said body out of upright position as said body swivels relative to said tube during the rise and fall movement thereof when floating.

7. A floating strainer assembly according to claim 6, wherein said hollow body comprises a common float symmetrically secured to the upper ends of said strainer portions.

References Cited in the file of this patent

UNITED STATES PATENTS

| | | |
|---|---|---|
| 1,516,693 | Anthony | Nov. 25, 1924 |
| 2,448,212 | Dewey | Aug. 31, 1948 |
| 2,608,300 | Small | Aug. 26, 1952 |
| 2,957,579 | McCombie | Oct. 25, 1960 |